Oct. 14, 1952     J. B. LETTS     2,613,996
SEALED FLOW DEVICE
Filed May 24, 1949
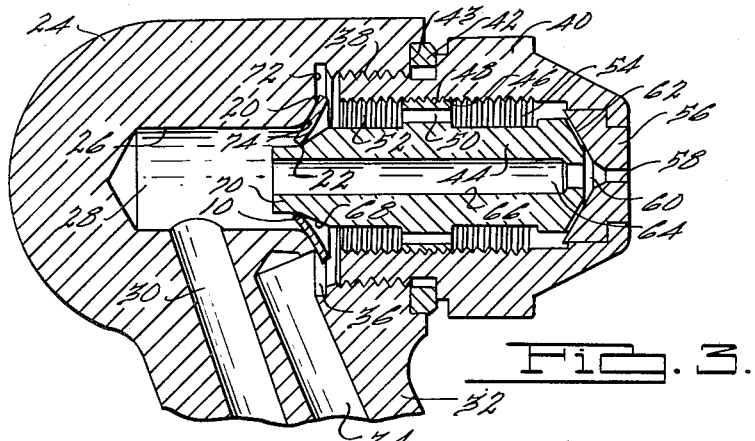
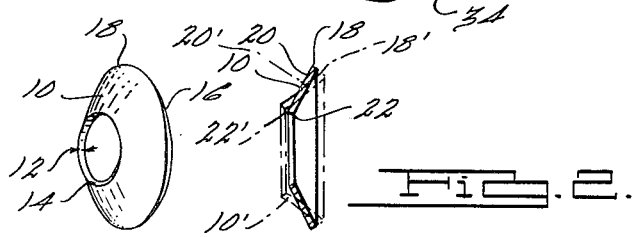
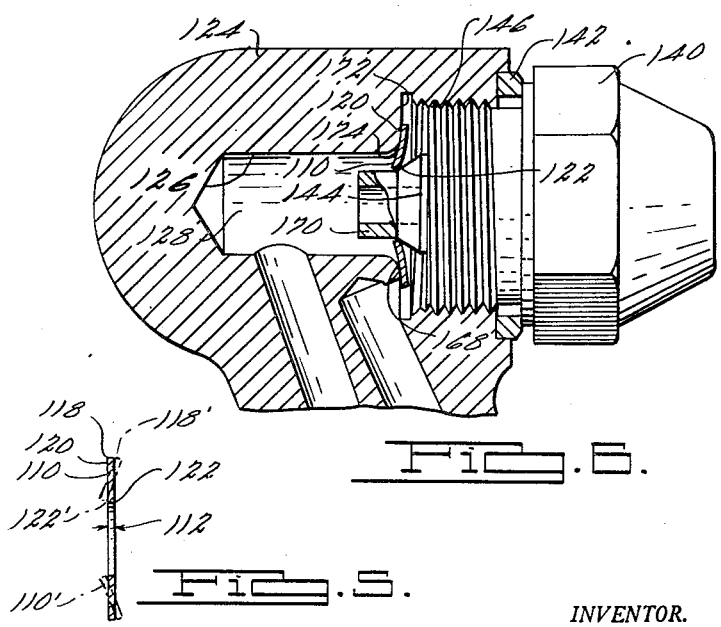
INVENTOR.
John B. Letts
BY
Harness and Harris
ATTORNEYS.

Patented Oct. 14, 1952

2,613,996

UNITED STATES PATENT OFFICE 2,613,996

SEALED FLOW DEVICE

John B. Letts, Highland Park, Mich., assignor to Chrysler Corporation, Highland Park, Mich., a corporation of Delaware Application May 24, 1949, Serial No. 94,943

10 Claims. (Cl. 299—107)

The present invention relates to sealed passage structure, and more particularly to a sealed device for directing and controlling fuel flow.

An object of the invention is to provide a sealing arrangement for use such as in a spray nozzle which leads to compact construction.

Another object is the provision of a metal seal such as will stand high temperatures and pressures yet is resilient so as to lend itself under certain conditions to intensified adjustment without noticeable permanent deformation such as might preclude re-use.

A further object of the invention is the provision of a seal to occupy the space between two telescoping sleeves or other members as of a nozzle such as may not be subject to direct and permanently deforming compressive forces but which allows the stresses contributing to the sealing engagement to be offset from a direct line with one another.

Still another object is to provide a return flow or bypassing fuel nozzle whereof the inlet and return stages are effectively sealed to the end that the seal has a minimum tendency to expand or also shrink and dry out when the stages are not maintained under the same conditions at all times. According to a feature of the seal it may be machined within close engineering tolerances and accurately finished to yield an even and polished surface.

Still a further object is to provide a nozzle adapted to be sealed by an easy and expeditious method of assembly.

These and other objects will become apparent upon a consideration of the attached specification.

Certain embodiments have been selected by way of illustrating the principles of the invention and appear in the accompanying drawings in which:

Figures 1 and 2 are respectively perspective and section views of a seal according to the present invention;

Figure 3 shows an application for the seal of Figures 1 and 2;

Figures 4 and 5 are respectively a perspective view and a sectional view of a modified seal; and Figure 6 is an application for the latter seal.

The seal of Figures 1 and 2 may comprise a body portion 10 formed of a strip having a relatively thin dimension as shown at 12 in respect to its entire width. Inner margin portion 14 borders the body portion 10. An outer margin 16 for the body portion may be formed so as to provide an edge 18 at the end of the lateral extent 20 thereof. On the opposite side of the seal from the lateral face 20 and edge 18 may be provided a corner 22 which may be of a circular configuration. The resilient seal may generally have a relaxed concavo-convex-like shape.

The seal just described may be found of advantage for use in a fuel atomizing nozzle such as is shown in Figure 3. The nozzle may be described as having a body portion 24 formed with inner walls 26 serving to define a restricted cavity 28, which may be of general cylindrical configuration. Shank 32 of member 24 may be provided with a bypass passage such as shown at 30 by means of which cavity 28 is drained. Another passage 34 formed in shank 32 is adapted to provide inlet fuel into the nozzle and communicates at its end with an annular chamber such as at 36. Holder 24 may be formed with threading 38 adapted to provide proper reception for a threaded member 40. A suitable washer as at 42 fits against a shoulder 43 on member 24 to provide proper sealing between the latter member and member 40. Internally of member 40 are formed threads such as at 46 for the reception of a central threaded flange 48 formed on an inner member 44. Member 44 may assume the form of a sleeve having a shank-like end portion 70 extending away from the central flange 48. Flange 48 acts to divide the chamber in member 40 into a passage 52 which communicates with annular chamber 36 and another passage 54, which passages are afforded mutual communication by means of ports 50 formed in the flange 48. A spray tip 56 is mounted in member 40 to provide an ejection orifice 58 for the purpose of producing a suitable spray pattern of fuel consumed by the atomizing nozzle. To the rear of ejection orifice 58 and axially aligned therewith may be a swirl chamber 60 having tangential feed passages 62 which serve as the immediate source of the fuel supplied. Inner walls 66 of member 44 define a passage 64 serving to bypass excess fuel from swirl chamber 60 and return it into chamber 28, which is drained as has been described.

As regards operation of the nozzle of Figure 3, fuel may be passed through the inlet 34 and along the respective chambers 36, 52, 50, 54, and 62 to be whirled into the swirl chamber 60. Part of the fuel may be ejected through orifice 58 and the balance of the fuel is bypassed through passage 64 and eventually passed out drain line 30. It will, of course, be recognized that if any appreciable pressure differential is found advantageous to the operation of the device as between the inlet and discharge stages of the nozzle, leakage must be reduced to an absolute minimum. It has been experimentally found that internal leakages between these stages may be successfully eliminated, high pressure differentials notwithstanding, by means of the seal of the instant invention. At the inner end 70 of member 44 may be provided a shoulder or abutment 68 which may appear of the shape of a truncated cone such as assumes a general frustoconical configuration. End 70 is adapted to be received in the seal such that the body portion 10 of the latter lies laterally thereof. Corner 22 may find some suitable location along shoulder 68 and upon assembly the lateral face 20 of the seal may abut against member 24. A faced-off portion, such as at 72 which serves to define the restrictions of the annular chamber 36, is provided around the opening of the cavity 28 in member 24 and has a flared portion 74 flaring from the cavity into the balance of the face of faced-off portion 72.

One desired mode of assembling the nozzle will be to insert the spray tip 56 non-leakably into member 40 and then introduce the inner member 44 and advance it down to a position such that it will firmly contact the tip 56 in place. Seal 42 may be lodged in member 24 against the shoulder 43 whereupon the body portion 10 of the resilient seal may be slipped over the end of portion 70 on member 44. As a unit, parts 40, 56, 44, and the resilient seal may be introduced into the holder 24 and advance inwardly thereof as by threading 38 to a point such that the lateral face 20 of the seal engages the faced-off portion 72 and simultaneously therewith seal 42 comes into interposed engagement between members 40 and 24. As the above described unit makes sealing engagement with member 24 the seal may be deflected such that its body portion 10 assumes the sprung shape 10', indicated in Figure 2. Additionally to be observed in Figure 2, is the fact that edge 22 may be deflected into a position 22' whereas edge 18 may be deflected into another position 18' owing to the fact that lateral face 20 may have been forced to assume a different angle such as indicated at 20'. While the degree of resilient deformation has been exaggerated for the purposes of emphasis, the seal nevertheless may undergo enough change in configuration such that the mean cone angle of its frusto conical shape is lessened. The seal may still retain the general appearance of a truncated cone although owing to the stresses to which it is subjected, the proportions may be changed somewhat. In fact, surface 20 of the seal may assume permanently the contour of the flared portion 74 of member 24 and the edge portion 18 may assume permanently the contour of shoulder 68 on member 44 when it appears advantageous to draw up the telescoping sleeves very tight.

In Figure 3, attention is to be called to the fact that the forces set up against corner 22 are spaced radially inwardly of the reaction forces set up along lateral face 20 of the seal and a free body analysis of the stresses will reveal that there is no direct compressive stress or strain to be at all involved. That is to say, the forces of reaction lie without the area of the inner margin stresses of the resilient seal. Such would, of course, not be the case if the stressing forces and the reacting forces were coincident with one another since direct compressive stresses and strain would be involved.

In Figures 4 and 5 a slightly modified seal has been represented. The body portion 110 is provided with an inner margin 114 and may be of relative minor thickness, as indicated at 112. The strip going to form the seal may be disposed along one general plane such as defined by lateral face 120. The outer margin may comprise an edge 118 disposed on the opposite side of body portion 110 from an inner corner 122 formed on the margin portion 114.

In Figure 6 the seal having the body portion 110 may be seen to have the same general application to a nozzle as was the preceding embodiment discussed. The portion 110 is adapted to receive the end 170 of member 144 and to engage at corner 122 the abutment 168, which may be likewise of frusto conical configuration. The faced-off area 172 having the flared portion 174 leading into internal cavity 128 is adapted to abut against lateral face 120 of the seal. The method of assembly may be much the same as was described in connection with the preceding embodiment and then again in either case it might be found advantageous to place the seal having the body portion 110 in holder 124 preparatory to inserting members 140, 144 and the spray tip as a unit into the holder 124. Similarly, however, the two axially shiftable members are drawn up together along threading 146 as by means of a tool gripping the nut formed on the periphery of member 140 to stress the seal having body portion 110 into a positive sealing engagement. In the process the seal will tend to assume a position, as 110' appearing in Figure 5, such as has been deflected out of the plane of the disk. Corner 122' will be moved somewhat as also will edge 118' around the outer periphery of body portion 110.

Again, the resilient seal of Figure 6 between members 144 and 124 is not subjected to direct compressive stresses inasmuch as the stress against corner 122 is in an inner area without which the stresses against lateral face 120 fall. The seal thereby undergoes a resilient deformation such as does not necessarily render it unadaptable for re-use as desirable and no permanent deformation need necessarily result. On the other hand, if the occasion demands a very tight seal, then the parts may be drawn up to urge the metal strip into a permanently deformed shape intimately following certain of the contours of the deforming members. The seal having body portion 110 may be of an annealed copper material or preferably of a stainless steel construction. Such being the case, body portion 110 will be free of the tendency to dry out, to become overheated and warped, or otherwise to deteriorate owing to the particular peculiarities of the application for which it is chosen. The fact is to be appreciated that metal may be made to withstand high temperatures and high pressures over a long period whereas less durable material serving as a seal will be inclined to deteriorate at a rather rapid rate.

In the preceding constructions, it is to be noted that all contacting surfaces involved may be machined or even polished to a high degree of design tolerances and that a precision contacting fit may readily be accomplished.

In accordance with the provisions of the patent statutes, I have described the principle of my invention together with apparatus in relation to which it is now considered to represent the best embodiments thereof, but I desire to have it understood that the structure shown is only illustrative and that the invention may be carried out by other means in due keeping with its general spirit and scope.

What is claimed is:

1. In a casing arrangement for a device of the character described, an outer casing member with a cylindrical bore and including means forming a shoulder portion therearound, a deformable ring resting on said shoulder portion and including an annular inner margin defining an aperture coaxial with and of less radial extent than said cylindrical bore, and an inner cylindrical casing member connected to project through said aperture and to be disposed within the bore in radially spaced relation thereto, said inner casing member comprising an external shoulder spaced from the end thereof yieldingly engaged by the deformable ring adjacent its annular inner margin so as to be placed in tension, said deformable ring prior to establishment of said yielding engagement assuming a resilient frusto-conical form and being operatively arranged to extend through the plane of said shoulder portion and into said bore.

2. In a bypass atomizing nozzle, a hollow body comprising a pair of radially spaced coaxial inner and outer casing portions, said outer casing portion having a generally cylindrical internal recess and a laterally outwardly extending annular arcuate surface forming a shouldered end opening for the same, said inner casing portion having a body provided with a reduced end and presenting an external annular tapered shoulder at the juncture of said reduced end to the body, said inner casing portion being fixedly related to the outer casing portion such that the reduced end of the former protrudes into the cylindrical internal recess of the latter with at least a portion of said tapered shoulder lying in the plane of said shouldered end opening for the internal recess and in radially spaced relation thereto, and an annular metal seal received in position in the space between the casing portions for closing off the path therebetween, said seal comprising a dished metal body supported by and pressing against said shouldered end opening and having inner margin means defining a central aperture and receiving said reduced end therethrough, said tapered shoulder on the inner casing portion pressing against the inner margin means so as to place said dished metal body deflectably in tension between said casing portions.

3. In a bypass atomizing nozzle, a hollow body comprising a pair of radially spaced coaxial inner and outer casing portions, said outer casing portion having a generally cylindrical internal recess and a laterally outwardly extending annular arcuate surface forming a shouldered end opening for the same, said inner casing portion having a body provided with a reduced end and presenting an external annular tapered shoulder at the juncture of said reduced end to the body, said inner casing portion being fixedly related to the outer casing portion such that the reduced end of the former protrudes into the cylindrical internal recess of the latter with at least a portion of said tapered shoulder lying in the plane of said shouldered end opening for the internal recess and in radially spaced relation thereto, and an annular metal seal received in position in the space between the casing portions for closing off the path therebetween, said seal comprising a dished metal body supported by and pressing against said shouldered end opening and having inner margin means defining a central aperture and receiving said reduced end therethrough, said tapered shoulder on the inner casing portion pressing against the inner margin means so as to place said dished metal body deflectably in tension between said casing portions, said element being of the general relaxed configuration of a metal washer.

4. In a bypass atomizing nozzle, a hollow body comprising a pair of radially spaced coaxial inner and outer casing portions, said outer casing portion having a generally cylindrical internal recess and a laterally outwardly extending annular arcuate surface forming a shouldered end opening for the same, said inner casing portion having a body provided with a reduced end and presenting an external annular tapered shoulder at the juncture of said reduced end to the body, said inner casing portion being fixedly related to the outer casing portion such that the reduced end of the former protrudes into the cylindrical internal recess of the latter with at least a portion of said tapered shoulder lying in the plane of said shouldered end opening for the internal recess and in radially spaced relation thereto, and an annular metal seal received in position in the space between the casing portions for closing off the path therebetween, said seal comprising a dished metal body supported by and pressing against said shouldered end opening and having inner margin means defining a central aperture and receiving said reduced end therethrough, said tapered shoulder on the inner casing portion pressing against the inner margin means so as to place said dished body deflectably in tension between said casing portions, said element being of the general configuration of a metal washer so formed as to assume a concavo-convex-like shape.

5. A return flow spray nozzle have a restricted hollow body member and including the combination with an inner member in the body adapted for axial movement relative to the restriction, said inner member comprising a shank-like sleeve portion including a shoulder and an end spaced therefrom and projecting into the restriction of said hollow body in transverse spacing thereto, said body and inner members having associated therewith means cooperating to define a constricted passage leading around said shoulder from the vicinity of said sleeve portion, said inner member including means forming a connecting passage directed therethrough to establish communication with said restriction in the body member, of a resilient metal element seatingly engaging the hollow body member adjacent the restriction and comprising an inner margin portion projecting radially clear of said restriction so as to obstruct the path of motion of at least a section of the shoulder of said sleeve portion and move therewith within the restriction, the section and the inner margin portion of the metal element being adapted in assembly to establish a resilient sealing cooperation whereby the latter element prevents communication through said restriction between the aforesaid passages.

6. A return flow spray nozzle having a restricted hollow body member and including the combination with an inner member in the body adapted for axial movement relative to the restriction in assembly positioning, said inner member comprising a shank-like sleeve portion including a shoulder and projecting into the restriction of said hollow body in transverse spacing thereto, said body and inner members having associated therewith means cooperating to define a constricted passage leading from the vicinity of said sleeve portion in one axial direction, the latter said member including means forming a connecting passage directed therethrough oppositely to said one direction to establish communication with said restriction in the body member, of a resilient metal element seatingly engaging the hollow body member adjacent the restriction and comprising an overhanging inner margin portion projecting radially inwardly of said restriction and disposed to lie unsupportedly in the path of motion of at least a section of the shoulder on said sleeve portion, the section and the inner margin portion of metal element being adapted in assembly to establish a resilient sealing cooperation whereby the latter element prevents communication through said restriction between the aforesaid passages, said resilient metal element assuming in initial relaxed condition the form of a thin disk-like ring.

7. An object comprising an elongated first member provided with a conical surface along its exterior tapering in an axial direction toward one end, a resilient seal comprising a continuous annular strip of a thickness of relatively thin dimensions as respects the general lateral extent or width of the strip, said strip being provided with means forming a central circular opening receiving said one end of the elongated member so as to engage said conical surface, a second member including cavity-forming structure comprising a faced-off portion around the opening of the cavity, and means associated with said members for supporting the first member to project at said one end into the cavity of the second member, said means being adjustable whereby sufficient inward movement will cause the resilient seal to be stressed into a sealing engagement with, along a portion thereof generally radially spaced from said central circular means, the faced-off portion of said second member.

8. In combination, an elongated first member provided with a conical surface along its exterior tapering in an axial direction toward one end, a resilient metal seal comprising a continuous annular disk of a thickness of relatively thin dimensions as respects the general lateral extent or width of the disk, said disk being provided with means forming a central circular opening receiving said one end of the elongated member so as to engage said conical surface, a second member including recess-forming structure comprising a faced-off portion around the opening of the recess, and means associated with said members for supporting the first member to project at said one end into the recess of the second member, said means being adjustable whereby sufficient inward movement will cause the resilient metal seal to be stressed into a sealing engagement with, along a portion thereof generally radially spaced from said central circular means, the faced-off portion of said second member, said resilient metal seal thereby tending to be deformed out of the plane of the disk into a configuration substantially conforming to the conical surface and faced-off portion of the respective first and second members.

9. In combination, an elongated first member provided with a conical surface along its exterior tapering in an axial direction toward one end, a resilient metal seal comprising a continuous annular disk of a thickness of relatively thin dimensions as respects the general lateral extent or width of the disk, said disk being provided with means forming a central circular opening receiving the said one end of the elongated member so as to engage said conical surface, a second member including recess-forming structure comprising a faced-off portion around the opening of the recess, and means associated with said members for supporting the first member to project at said one end into the recess of the second member, said means being adjustable whereby sufficient inward movement will cause the resilient metal seal to be stressed into a sealing engagement along a portion thereof generally radially spaced from said central circular means, with the faced-off portion of the second member, the initial free shape of the seal being of configuration of a truncated cone of a predetermined cone angle and the stressed shape being of a different mean cone angle.

10. In combination, an elongated first member provided with a conical surface along its exterior tapering in an axial direction toward one end, a resilient metal seal comprising a continuous annular disk of a thickness of relatively thin dimensions as respects the general lateral extent or width of the disk, said disk being provided with means forming a central circular opening receiving the said one end of the elongated member so as to engage said conical surface, a second member including recess-forming structure comprising a faced-off portion around the opening of the recess, and means associated with said members for supporting the first member to project at said one end into the recess of the second member, said means being adjustable whereby sufficient inward movement will cause the resilient metal seal to be stressed into a sealing engagement along a portion thereof generally radially spaced from said central circular means, with the faced-off portion of the second member, the original free shape of the seal being of configuration of a truncated cone of a predetermined cone angle and the stressed shape being of a relatively smaller mean cone angle as a consequence of the active stresses originating in the central circular means being inwardly offset from the direct line of the reactive forces in the seal set up due to the aforesaid engagement with the faced-off portion of the second member.

JOHN B. LETTS.

REFERENCES CITED

The following references are of record in the file of this patent:

UNITED STATES PATENTS

| Number | Name | Date |
|--------|------|------|
| 753,974 | Glauber | Mar. 8, 1904 |
| 1,393,316 | Roth | Oct. 11, 1921 |
| 1,604,211 | Williams | Oct. 26, 1926 |
| 1,644,372 | Gray | Oct. 4, 1927 |
| 1,685,059 | Bailey | Sept. 18, 1928 |
| 1,721,326 | Wilson | July 16, 1929 |
| 2,439,257 | Lum | Apr. 6, 1948 |
| 2,484,037 | King | Oct. 11, 1949 |